J. C. MILLIGAN.
Sheet-Iron Scoops.
No. 147,854.            Patented Feb. 24, 1874.
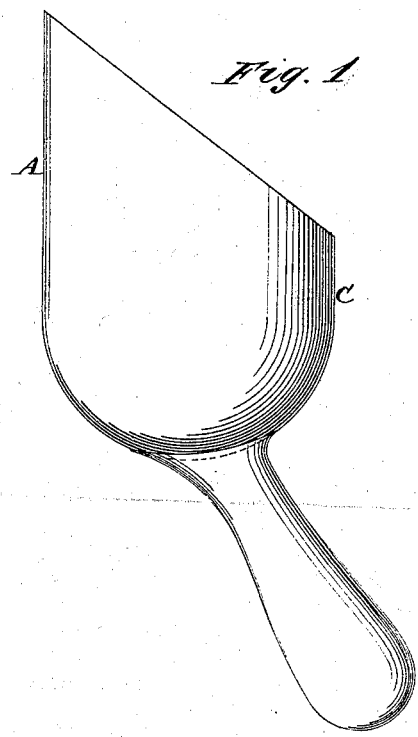

UNITED STATES PATENT OFFICE.

JOHN C. MILLIGAN, OF NEW YORK, N. Y., ASSIGNOR TO LALANCE AND GROSJEAN MANUFACTURING COMPANY, OF SAME PLACE.

IMPROVEMENT IN SHEET-IRON SCOOPS.

Specification forming part of Letters Patent No. 147,854, dated February 24, 1874; application filed September 6, 1873.

*To all whom it may concern:*

Be it known that I, JOHN C. MILLIGAN, of city, county, and State of New York, have invented a new and useful Improvement in Sheet-Iron Scoops; and I do hereby declare that the following is a full, clear, and exact description of the same, reference being had to the accompanying drawing forming a part of this specification.

The invention consists in a flour-scoop made of one piece of iron, as hereinafter described, and pointed out in the claim.

The drawing is a side elevation.

The scoop has the short side C and the prolonged or extended one A, the whole being made of ductile metal and brought into shape through a series of dies which gradually approximate and finally reach the shape shown in the drawing.

The articles of the kind heretofore known to the public were made in two or more pieces, seamed, and lacking the requisite smoothness and evenness of face, while they are not nearly so durable as mine, and more subject to accident.

I am aware that a trough-shaped scoop has been made of one piece of metal; but none, I believe, with the cover C made from a cylinder with one closed end, by simply making a diagonal cut thereacross and affixing a handle to the closed end.

Having thus described my invention, what I claim as new is—

The one-piece covered scoop consisting of a seamless tube, A C, cut diagonally, and provided with a handle at the closed end, as set forth.

JOHN C. MILLIGAN.

Witnesses:
JAMES T. GRAHAM,
T. B. MOSHER.